United States Patent [19]

Bluestein et al.

[11] 3,882,485

[45] May 6, 1975

[54] UNIVERSAL POLYBINARY MODEM

[75] Inventors: Leo I. Bluestein, Bedford; John H. Meyn, Carlisle, both of Mass.

[73] Assignee: GTE Laboratories Incorporated, Waltham, Mass.

[22] Filed: Oct. 3, 1973

[21] Appl. No.: 402,959

[52] U.S. Cl. ........................ 340/347 DD; 325/38 A

[51] Int. Cl. ............................................. H04l 3/00

[58] Field of Search ............ 340/347 DD; 325/38 A; 178/68; 235/154

[56] References Cited

UNITED STATES PATENTS

| | | | |
|---|---|---|---|
| 3,601,702 | 8/1971 | Lender | 325/38 A |
| 3,754,237 | 8/1973 | de Laage de Meux | 340/347 DD |
| 3,781,873 | 12/1973 | Nussbaumer | 325/38 A X |

*Primary Examiner*—Eugene G. Butz
*Assistant Examiner*—David H. Malzahn
*Attorney, Agent, or Firm*—Irving M. Kriegsman; Leslie J. Hart

[57] ABSTRACT

A method and apparatus for forming polybinary signals of a desired class with a universal polybinary modem are described. The universal polybinary modem enables the selection of a class of polybinary signals which have essentially zero energy at an upper band edge. As described with reference to one embodiment the desired class of polybinary signals is obtained by selectively combining the outputs of taps of a delay line whose taps are spaced at intervals corresponding to the baud rate of the data. The combination involves multiplication, addition or subtractions in accordance with the desired class of polybinary signals. In an alternate embodiment a digital network is provided to obtain the desired class of polybinary signals.

11 Claims, 2 Drawing Figures

UNIVERSAL POLYBINARY MODEM

FIELD OF THE INVENTION

This invention relates to a method and apparatus for adapting a bandwidth limited communication channel such as a telephone line to the transmission of digital data at a high rate. More specifically, this invention relates to a universal modem for generating polybinary signals which have zero power at the upper band edge of the channel.

BACKGROUND OF THE INVENTION

In recent years the growth of data transmission has resulted in methods and devices capable of increasing the speed at which data may be sent over communication lines. One development in the pursuit of higher data rates involves the transmission of data with multiple levels, i.e., a polybinary system.

Various constraints may be imposed upon the data transmission such as a high bit rate and a reduction to zero of the transmitted signal energy at the edges of the bandwidth of the communication line. A general discussion and description of various techniques employed to achieve high speed transmission of data with satisfactory accuracy are presented in an article entitled "Correlative Level Coding for Binary-data Transmission" by Adam Lender and published in the IEEE Spectrum of February 1966 at page 104.

As described in the latter article, polybinary signals are a way of representing binary data with more than two levels. It is recognized, for example, that the increase of levels in the data signals allows for increases in the speed capability, but generally at the expense of greater sensitivity to noise and poorer error performance.

Devices, known as modems, have been built to condition binary data signals for transmission and reception over a communication circuit in this polybinary form. Such modems have transfer functions whose spectra approach zero at the upper band edge of the communication circuit in a continuous manner sometimes with a continuous derivative. With such modems, sharp cutoff filters are unnecessary and binary transmission at the Nyquist rate is practical. The Nyquist transmission rate is that data rate which equals twice the bandwidth of the communication circuit. The continuity of the frequency spectrum at the band edges, however, is achieved with a predetermined amount of intersymbol interference in the signal at the receiving end.

Intersymbol interference is the effect which a data bit has upon the reception of subsequent data bits. Such interference, however, can be controlled in certain situations and used to provide a high speed polybinary transmission system capable of accurate data transmission with generally low errors and at data rates equal to or greater than the Nyquist rate.

The use of polybinary signals which exhibit zero power density at the upper band edge and a generalization of their forms are described in an article entitled "Generalization of A Technique for Binary Data Communication" by E. R. Kretzmer and published in the IEEE Transactions on Communication Technology of February 1966, pages 67–68. In the Kretzmer article, a family of various classes of polybinary signals is described as of particular interest. The classes in the family are characterized by the number of levels employed and the shape of the spectrum function.

The selection of a modem or a class of polybinary signals depends upon a variety of factors such as the channel, the required available bandwith, the noise level and related physical channel constrainst which enable one class to provide better data transmission than another. Modems for a particular polybinary signal have involved complicated filters which are not conveniently changed to enable the use of a different polybinary signal class.

SUMMARY OF THE INVENTION

With a polybinary signalling apparatus according to the invention, a universal modem is provided which can be conveniently changed to generate polybinary signals of different classes in a family to match a variety of channel conditions. The universal polybinary modem employs a single basic pair of wave shaping filters, preferably one each at the transmitter and receiver in cascade with a class control network at the transmitter or the receiver. The class control network includes a circuit for producing samples of the precoded data signals with the samples being effectively spaced at intervals corresponding to the baud rate of the data bits being transmitted. In one embodiment a tapped delay line is used with taps separated to provide successive samples at intervals of a time period, T. For a signalling scheme where the baud rate is equal to the Nyquist rate, $2TW = 1$ where W is a selected bandwidth, such as the bandwidth of the communication channel.

In a digital form of the invention, the sampling network is formed with a shift register wherein the values of sequential signal samples are shifted along and are available to be combined in a predetermined manner to form the desired polybinary signal when connected in the system in a manner described below.

An advantage of a universal polybinary modem according to the invention resides in that the same complicated wave shaping filter pair for producing a duobinary signal may be used for a variety of channel conditions. The particular class of polybinary signal is formed by appropriately combining selected samples of the precoded data signals and passing the signals so processed through the two duobinary filters and the channel. The loss in noise performance utilizing a universal modem of this invention may be held within reasonable and acceptable limits.

It is, therefore, an object of the invention to provide a method for forming polybinary signals of a desired class in a convenient manner. It is a further object of the invention to provide a universal polybinary modem which may be conveniently adapted to produce different polybinary signals for a variety of channels. It is still further an object of the invention to provide a universal polybinary modem with a convenient structure.

BRIEF DESCRIPTION OF DRAWINGS

These and other objects and advantages of the invention will be understood from the following description of several embodiments described in conjunction with the drawings wherein.

DETAILED DESCRIPTION OF EMBODIMENTS

Figure 1:
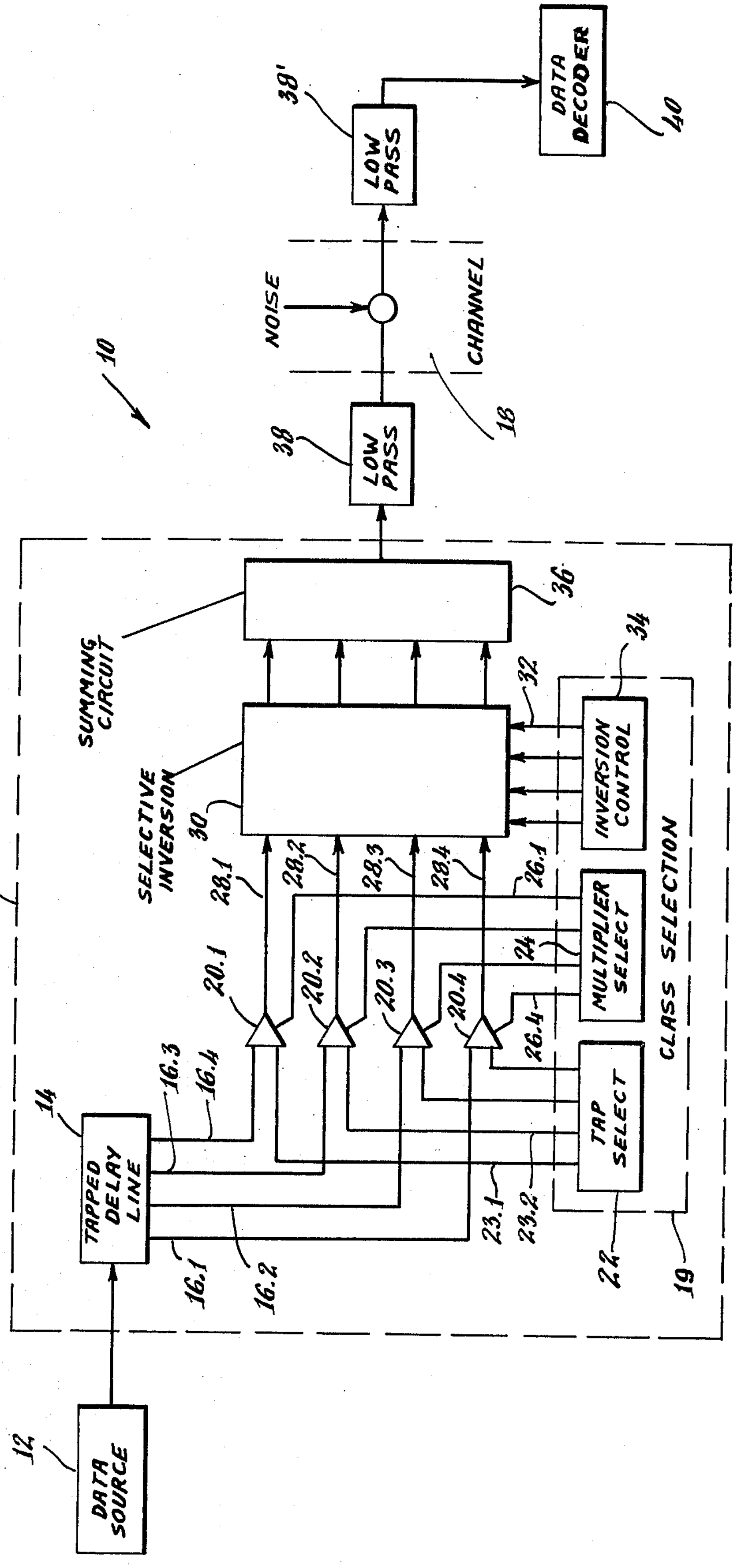
FIG. 1 is a block diagram of an analog form for a universal polybinary modem in accordance with the invention.

With reference to FIG. 1 a transmission system 10 is shown formed of a data source 12 which produces a stream of binary data such as from a computer. The data has been precoded for a desired class of polybinary signals in the manner such as described in the aforementioned Lender article. The process and apparatus for precoding is known and is not a part of this invention.

The data signals are applied to a class control network 13 which converts the duobinary transmission system into a polybinary system of a desired class. Network 13 includes a delay line 14 which has output taps 16.1–16.4 spaced by a distance selected to produce a delay period T between successive taps 16 and corresponding to the time period between successive samples and the baud rate of the transmitted data. In practice, the time duration for $T$ is determined by the relationship $2TW = 1$ where $W$ represents the selected bandwidth of the channel 18 through which the data is to be transmitted.

The outputs on taps 16 are then transformed by a class selection network 19 for conversion into a polybinary form. Taps 16 are each coupled to a conventional analog amplifier 20 which may be enabled by a tap select network 22 along a gate line 23. In addition, a multiplier selection network 24 is associated with each amplifier 20 to establish a scale of multiplication for each amplifier with appropriate signals on lines 26. The operation of multiplication with operational amplifiers is well known and, therefore, need not be further described.

The outputs 28 of amplifier 20 are connected to an inversion selection network 30 with which the outputs 28 may be converted to negative values or not converted as determined by appropriate gate control signals on lines 32 produced from an inversion control network 34.

Those amplifier outputs 28 selected and processed under the control of class selection network 19 are then summed in a summing circuit 36 whose output, after passage through a wave shaping filter 38, is applied to channel 18 for transmission. A similar wave shaping filter 38' is provided at the other end of the channel 18. The output from filter 38' is applied to an appropriate data decoder 40 determined in accordance with the desired polybinary signal as described in the Lender article.

Filters 38-38' together provide wave shaping corresponding to the wave shape for a class 1 or duobinary signal. Thus each filter 38 has a transfer function of $\sqrt{\cos(\pi f/2F)}$ so that the pair of filters produce the spectral shape $\cos(\pi f/2F)$ corresponding to a class 1 or duobinary signal as described in the previously identified Kretzmer article. Thus, with a bandwidth of $F$, the value of the power spectrum at the upper edge is essentially zero.

The universal polybinary modem 10 is formed as shown in FIG. 1 on the basis that each polybinary signal whose power spectrum goes to zero at the upper band edge can be considered as being produced by the arrangement of a transversal filter 13 in cascade with a duobinary filter 38-38'. Stated in mathematical terms, the class control network 13 in FIG. 1 has a discrete system function $$A(z^{-1}) = \sum_{i=\infty}^{\infty} b_i z^{-i}$$

where $z^{-1} = e^{-j2\pi fT}$ is a T- unit delay operator, and $b_i$ is the $i_{th}$ tap gain.

Whenever the sequence $(b_i)$ is finite in length $N$, $A(Z^{-1})$ is a finite $(N-1)^{th}$ order polynominal in $Z^{-1}$ which can be written as a product involving its zeroes, $a_1$, as follows:

$$A(z^{-1}) = k \prod_{i=1}^{N-1} (z^{-1} - a_i)$$

Another expression for the spectrum in the passband is $$S(f) = k \prod_{i=1}^{N-1} (e^{-j2\pi fT} - a_i)$$

When the spectrum is zero at the band edges or at a frequency $F$, $$e^{-j2\pi FT} - a_i = 0$$

for some $i$.

Since for the useful polybinary signals the frequency where zero spectral density occurs is $(1/2T)$ for all members of the family of classes, $e^{-j\pi} - a_i = 0$ is a factor of $S(f)$, and that $a_i = -1$; i.e., $Z^{-1} + 1$ is a common factor in all filters which yield polybinary signals with zero spectral density at $F = (1/2T)$.

Consequently, the various useful classes of polybinary signals as described in the aforementioned Kretzmer article have a mutual relationship as follows:

| Class | Duobinary Factor | Transversal Factor |
|---|---|---|
| 1 (Duobinary) | $(1 + Z^{-1})$ | 1 |
| 2 | $(1 + Z^{-1})$ | $(1 + Z^{-1})$ |
| 3 | $(1 + Z^{-1})$ | $(2 - Z^{-1})$ |
| 4 | $(1 + Z^{-1})$ | $(1 - Z^{-1})$ |
| 5 | $(1 + Z^{-1})$ | $(-1 + Z^{-1} + Z^{-2} - Z^{-3})$ |

$Z^{-1}$ is an operator, representing a delay of one sample so that the factor $(1 + Z^{-1})$ is a duobinary factor common to the classes. The duobinay factor is supplied by the duobinary wave shaping filter pair 38-38'. The conversion to a continuous channel wave form is performed by filter 38. The other factors are physically realized by a multiplication process and an arithmetic addition or subtraction of selected samples.

Thus in a class 5 polybinary signal, the transversal factor is formed as follows: the signal value at a time $t$ is subtracted (as a result of the $-1$ taps in the transversal factor) from the sum of the signal values at times of $t - T$, (determined by operator $Z^{-1}$) and $t - 2T$, (i.e., operator $Z^{-2}$) while the signal value at the time of $t - 3T$ (i.e., operator $Z^{-3}$) is again subtracted to yield the desired signal of class 5 for input to filters 38-38'.

In a similar manner for a class 2 polybinary signal, the value of the signal at a time $t$ is added to the value of the signal at a time $t - T$ (i.e., $Z^{-1}$) to yield a class 2 polybinary signal.

Figure 2:
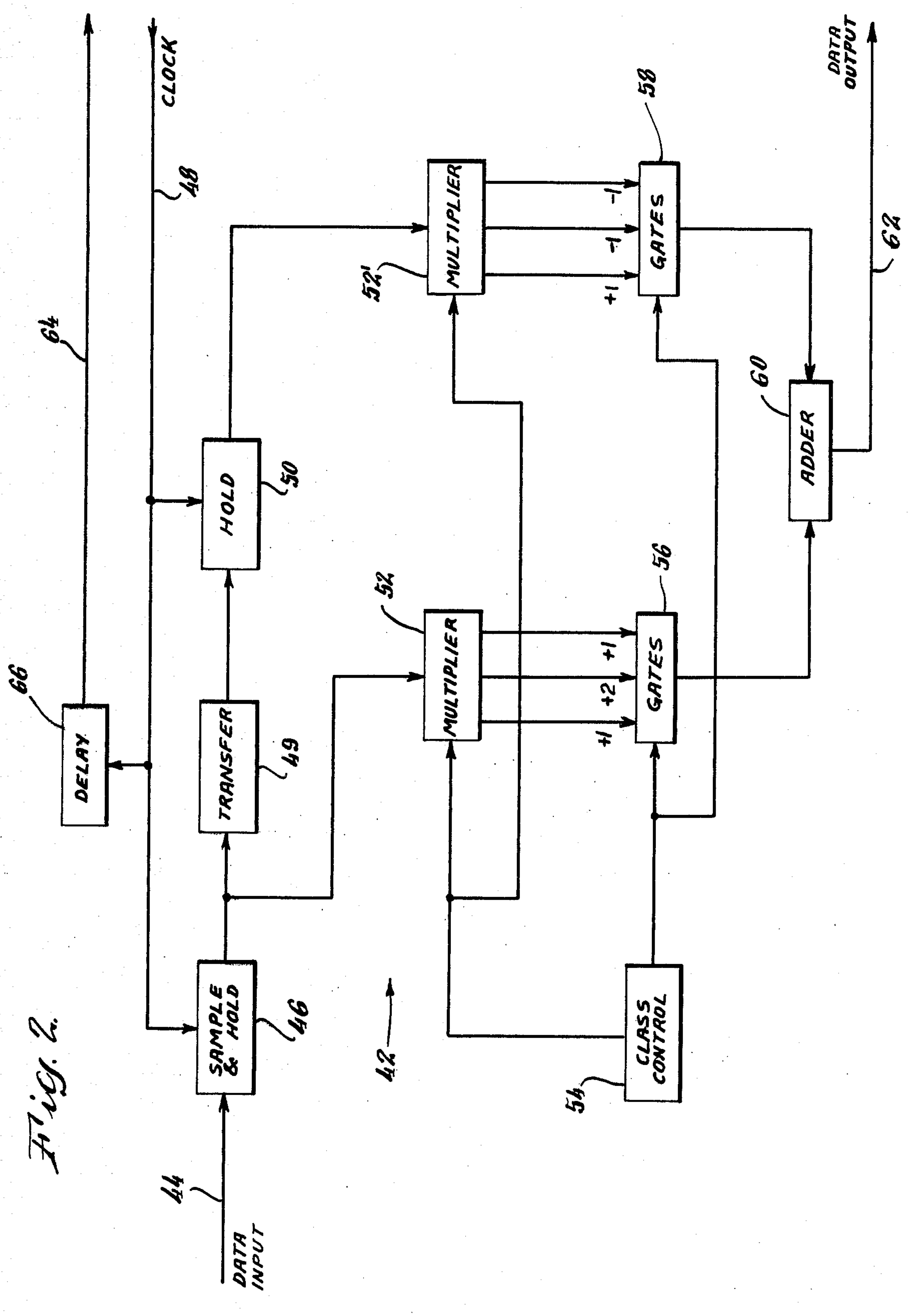
FIG. 2 is a block diagram of a digital class control network for use in a universal polybinary modem in accordance with the invention.

FIG. 2 shows a schematic form for a digital class control network 42 suitable for the generation of polybinary signals of classes 2, 3 and 4. Digital binary data, precoded for a desired polybinary class, arrive on an input line 44 where a sample and hold network 46 operates at a clock rate having T-second intervals. The clock pulse for this are derived from the data and applied on line 48.

Each sampled signal is transferred at the clock period T with a transfer network 49 to a hold circuit 50. After the transfer, the stored signals are operated on by multiplier networks 52-52' which under control from a class control circuit 54 provide the addition, subtraction or multiplication of the two samples stored in networks 46 and 50.

Depending upon the selected polybinary class, gates 56, 58 provide appropriate outputs to an adder 60 whose output line 62 provides a manipulated data sequence which, when applied to the duobinary filters 38-38' of FIG. 1 yield the desired polybinary signal. The output from adder 60 is available upon the occurrence of an output signal on line 64 from a delay network 66 driven by clock pulses on line 48, to provide time for the accomplishment of all operations in class control network 42.

The universal polybinary modem network shown in FIG. 2 provides the appropriate intersymbol combinations by shifting successive data input samples between hold networks 46 and 50. This shifting operation is a sampled data equivalent to the tapped delay line 14 of FIG. 1. If additional hold networks are provided, other polybinary classes such as No. 5 may be generated.

Having thus described a method and apparatus for producing polybinary signals and a universal polybinary modem according to the invention, its advantages can be appreciated. A common duobinary filter network may be employed for all channels while a particular class of polybinary signals may be conveniently selected in accordance with the characteristics of the channel through the use of a class control network.

The class control network and duobinary filter pairs may alternatively be located at different places along a communication channel. For example, the control network may be at the receiver end with the duobinary filter pair, which now becomes a single filter. In such latter case the clock signals are derived from the received signal.

What is claimed is:

1. A method for generating polybinary signals for high rate communication with predetermined bandwidth along a channel, the polybinary signals being of a family characterized by signal classes having essentially zero energy at an upper band edge, comprising the steps of selecting precoded data signals at intervals corresponding to successive data; the precoded data signals being precoded for transmission of data at a predetermined rate and in a form for a desired polybinary class;

arithmetically combining the selected precoded data signals in a manner corresponding to the desired polybinary signal class; and passing the arithmetically combined precoded data signals through a duobinary wave shaping network.

2. The method for generating polybinary signals for a desired class as claimed in claim 1 wherein the selecting step further includes sampling the precoded data signal at intervals corresponding to successive data;

storing the samples in successively located networks;

shifting the samples along the successively located networks; and wherein the arithmetic combining step includes the step of arithmetically combining selected ones of the stored samples in the networks in a manner determined by the desired polybinary class for production thereof.

3. The method for generating polybinary signals of a desired class as claimed in claim 1 wherein the selecting step further includes advancing the precoded data signal along a tapped delay line having taps whose spacing corresponds to intervals between successive data and wherein the combining step includes the step of arithmetically combining the signal values at selected tapts of the tapped delay line to form the desired class of polybinary signals.

4. A method for generating polybinary signals for high band rate data communication along a channel of limited bandwidth, the polybinary signals being of a family characterized by signal classes having essentially zero energy at the upper band edge of the communication channel with data being transmitted at a predetermined baud rate, comprising the steps of selecting precoded data signals at predetermined baud intervals selected for formation of a desired polybinary class, the data signals being precoded for the transmission of data at the baud rate through the channel in a form for the desired polybinary class;

arithmetically combining the selected data signals in a manner determined by the desired polybinary signal class to form said desired polybinary signals; and passing the arithmetically combined precoded data signals through a duobinary wave shaping filter.

5. A universal polybinary modem for use in a system in which data signals precoded for a desired class of polybinary signals having essentially zero energy at an upper band edge are transmitted along a communications channel at a high baud rate and are decoded at a receiving end of the channel comprising means for selecting the precoded data signals at successive intervals corresponding to the baud rate employed in the precoded data signals;

means, connected to the output of the selecting means, for arithmetically combining predetermined selected precoded data signals in accordance with a desired class of polybinary signals having a power spectrum of essentially zero at the upper band edge; and a duobinary wave shaping network in line with the communications channel, the network receiving the output of the combining means and, in conjunction with the selecting and combining means, forming the desired class of polybinary signals.

6. The universal polybinary modem as claimed in claim 5 wherein the selecting means further includes a tapped delay line having taps located at intervals corresponding to the time period T equal to the baud interval between data signals, with predetermined precoded data signals present on the taps being formed into the desired polybinary class by the combining means.

7. The universal polybinary modem as claimed in claim 5 wherein the selecting means further includes means for sampling the data signals at intervals equivalent to the baud rate;

means for storing the sampled signals in successively located storage elements;

means for shifting the stored samples along the storing means at a rate equivalent to the sampling rate, and wherein the combining means includes means for operating on selected ones of the stored signals in accordance with the desired class of polybinary signals to form said desired class of polybinary signals.

8. The universal polybinary modem as claimed in claim 7 wherein the operating means includes means for multiplying the selected ones of stored signals; and means for adding the multiplied selected signals.

9. A universal polybinary modem wherein data signals, which are precoded for a desired class of polybinary signals, are transformed into the desired polybinary class for transmission along a communication channel of limited bandwidth at a high baud rate comprising a duobinary wave shaping network located in line with the communication channel to limit the energy of the polybinary signals essentially to zero at the upper band edge;

means for selecting the precoded data signals at intervals spaced in time substantially equal to the baud rate of the data signals; and means for arithmetically combining predetermined selections of the precoded data signals in a manner for forming the desired class of polybinary signals which are applied to the duobinary wave shaping network.

10. The universal polybinary modem as claimed in claim 9 wherein the selecting means includes a tapped delay line having output taps located at intervals corresponding to the baud rate of the data signals.

11. The universal polybinary modem as claimed in claim 10 wherein the combining means includes a class selection network coupled to select output taps of the delay line for arithmetically combining the predetermined selections into the desired class of polybinary signals; and wherein the combining means further includes operating means for adding and multiplying the signals on selected output taps to form the desired class of polybinary signals.

* * * * *